United States Patent
Sakashita et al.

(10) Patent No.: US 9,753,915 B2
(45) Date of Patent: Sep. 5, 2017

(54) LINGUISTIC ANALYSIS AND CORRECTION

(71) Applicant: Disney Enterprises, Inc., Burbank, CA (US)

(72) Inventors: Tadashi George Sakashita, Cottonwood Heights, UT (US); Imran Goychayev, Valencia, CA (US); Alejandra Ledesma, South Pasadena, CA (US); Luigi Pardo, Los Angeles, CA (US); Sonia Souto Sieiro, London (GB)

(73) Assignee: DISNEY ENTERPRISES, INC., Burbank, CA (US)

( * ) Notice: Subject to any disclaimer, the term of this patent is extended or adjusted under 35 U.S.C. 154(b) by 61 days.

(21) Appl. No.: 14/819,597

(22) Filed: Aug. 6, 2015

(65) Prior Publication Data

US 2017/0039191 A1    Feb. 9, 2017

(51) Int. Cl.
*G06F 17/28* (2006.01)
*G06F 17/22* (2006.01)

(52) U.S. Cl.
CPC ...... *G06F 17/2854* (2013.01); *G06F 17/2223* (2013.01); *G06F 17/2872* (2013.01)

(58) Field of Classification Search
CPC ...... G06F 17/214; G06F 3/1204; G06F 3/122; G06F 3/1225; G06F 3/1284
USPC ..... 704/4; 345/472, 467, 468, 471; 715/262, 715/269
See application file for complete search history.

(56) References Cited

U.S. PATENT DOCUMENTS

| | | | |
|---|---|---|---|
| 5,883,986 A | 3/1999 | Kopec et al. | |
| 6,426,751 B1* | 7/2002 | Patel | G06F 17/214 |
| | | | 345/468 |
| 7,558,725 B2 | 7/2009 | Greenwald et al. | |
| 8,418,055 B2 | 4/2013 | King | |
| 2005/0289463 A1 | 12/2005 | Wu et al. | |
| 2007/0262991 A1* | 11/2007 | Abulhab | G06F 3/018 |
| | | | 345/467 |
| 2008/0086298 A1 | 4/2008 | Anismovich et al. | |
| 2010/0106481 A1 | 4/2010 | Lo | |
| 2011/0090253 A1 | 4/2011 | Good | |
| 2012/0259621 A1 | 10/2012 | Anisimovich et al. | |
| 2014/0035823 A1 | 2/2014 | Khoe et al. | |
| 2014/0067371 A1 | 3/2014 | Liensberger | |
| 2014/0081619 A1 | 3/2014 | Solntseva et al. | |
| 2014/0122062 A1 | 5/2014 | Zangvil | |
| 2016/0078656 A1* | 3/2016 | Borson | G06F 17/214 |
| | | | 345/472 |

OTHER PUBLICATIONS

Grammarly.com, "Write better, right now.", Obtained at url: https://www.grammarly.com/, Jan. 1, 2015, pp. 1-4.

(Continued)

*Primary Examiner* — Charlotte M Baker
(74) *Attorney, Agent, or Firm* — Dorsey & Whitney LLP (57) ABSTRACT

Methods, computer program products, and systems for correcting a glyph in a translated text are described. In one embodiment, the method includes identifying a first form of a first glyph in a translation text having a plurality of contextual properties and analyzing, by the processor, the first form of the first glyph with reference to one or more glyph form tables comprising a plurality of forms of the first glyph based, at least in part, on the plurality of contextual properties.

17 Claims, 7 Drawing Sheets

(56) References Cited

OTHER PUBLICATIONS

Whitelaw, Casey et al., "Using the Web for Language Independent Spellchecking and Autocorrection", Pyrmont NSW, Australia, Aug. 9, 2009, pp. 890-899.
Zimmer, Ben, "When Autocorrect is Not So Correct: Word Routes: Thinkmap Visual Thesaurus", Obtained at url: https://www.visualthesaurus.com/cm/wordroutes/when-autocorrect-is-not-so-correct/, Jan. 14, 2011, pp. 1-2.

* cited by examiner

| Character | Initial Form | Medial Form | Final Form | Isolated Form |
|---|---|---|---|---|
| Jeem ج | جـ | ـجـ | ـج | ج |
| Hah ح | حـ | ـحـ | ـح | ح |
| Noon ن | نـ | ـنـ | ـن | ن |
| Lam ل | لـ | ـلـ | ـل | ل |

FIG. 4

```
public char ReturnSpecialCharacter(long iHexCharacterValue, bool bEnd, bool bStart)
{
    char sChar = (char)iHexCharacterValue;
    long iHexSpecialChange = iHexCharacterValue;
    if (ISecondarySpecialCharacter != 0x0000)
    {
        iHexSpecialChange = LookupHexBasedOnCharacter(ISecondarySpecialCharacter);
    }
    if (bEnd && bStart)
        sChar = ReturnCharValue(iHexSpecialChange, 4);    // isolated character
    else
    {
        if (!bEnd && !bStart)
            sChar = ReturnCharValue(iHexSpecialChange, 3);    // middle character
        else
        {
            if (bEnd)
                sChar = ReturnCharValue(iHexSpecialChange, 1); // end character
            else
                sChar = ReturnCharValue(iHexSpecialChange, 2); // start character
        }
    }
    return (sChar);
}
public bool IsSpecialCharacter(string sText, int iIndex, int iDirection)
{
    long IHexCharacter = sText[iIndex + iDirection];
    long IHexCurrent = sText[iIndex];
    // We have a special rule.  If a certain character preceeds the one we are looking at, then it is a beginning character
    if (iDirection < 0)
    {
        // check to see if the character is a special one
        for (int i = 0; i < IHexSpecialNextIsBeginning.Length; i++)
        {
            if (IHexCharacter == IHexSpecialNextIsBeginning[i])
                return true;
        }
    }
```

FIG. 5A

```
    // We have another special rule. If the current character is a LAM, we have to check what the
character is that follows it. if it is a special character, then we have to combine the two into one, and skip
the next character
    // the lead character is LAM
    if (iDirection > 0)
    {
        if (HexCurrentInMatchingList(lHexCurrent))
        {
            if (HexCharacterInMatchingList(lHexCharacter))
                lSecondarySpecialCharacter = lHexCharacter;
        }
    }
    for (int i = 0; i < lHexBreaks.Length; i++)
    {
        if (lHexCharacter == lHexBreaks[i])
            return true;
    }
    return false;
}
```

LINGUISTIC ANALYSIS AND CORRECTION

BACKGROUND

Contextual based languages typically incorporate different forms of a particular glyph depending on a number of different factors, which vary based on the specific language. For example, the form of the glyph may depend on surrounding or environmental glyphs, the location of the glyph in a word, and/or the context in which the glyph is used. As a particular example, in Arabic there are at least five forms of a glyph: an initial form for the beginning of a word, a medial form for the end of a word, a final form for the end of a word, a base or isolated form, and a special form. In other contextual based languages, such as Japanese and Chinese, combinations of glyphs may change the meaning of the individual glyphs. Therefore, the context in which the glyph is used may affect the meaning of the phrase or sentence. Because glyphs can change form and meaning depending on how they are used, accurate translations are error prone. Accurate translations require understanding of the varying linguistic rules and require time intensive human review, which is not only inefficient, but costly, and prone to errors.

SUMMARY

In one embodiment, a method for correcting glyphs in a translated text is described. In this embodiment, the method includes identifying a first form of a first glyph having a plurality of contextual properties in a translation text and analyzing, by the processor, the first form of the first glyph with reference to one or more glyph form tables comprising a plurality of forms of the first glyph based, at least in part, on the plurality of contextual properties.

In another embodiment, a computer program product for correcting a symbol in a translated text is described. In this embodiment, the computer program product includes a non-transitory, machine readable storage device having computer program instructions stored thereon for execution by a processor. The program instructions include instructions to identify a symbol having a plurality of contextual properties in a translation text, instructions to compare a first appearance of the symbol to one or more tables describing a plurality of appearances of the symbol based, at least in part, on the plurality of contextual properties, instructions to determine a second appearance of the symbol based, at least in part, on the one or more tables and the contextual properties, and instructions to replace the first appearance of the symbol with the second appearance of the symbol in the translated text.

In another embodiment, a system for correcting a character in a translated text is described. In this embodiment, the system includes one or more processors, and a non-transitory, machine readable storage device having computer program instructions stored thereon for execution by a processor. The program instructions include instructions to identify a first style of a character having a plurality of contextual properties in a translation text, instructions to compare the character to one or more data structures stored in the storage device and describing a plurality of styles of the character based, at least in part, on the plurality of contextual properties, instructions to determine a second style of the character based, at least in part, on the one or more data structures and the contextual properties, and instructions to replace the first style of the character with the second style of the character in the translated text.

OVERVIEW

Embodiments described herein are directed to the identification and correction of errors in translations to contextual based languages employing glyphs whose forms and/or meanings depends on certain contextual properties, such as the locations and/or contexts in which they are used. As used herein, "contextual based language" means any language that includes one or more glyphs having different forms depending on the context in which it is used. Examples of contextual based languages include Arabic, Hebrew, Chinese, and Japanese, among others. Contextual based languages can be contrasted with non-contextual based languages, such as English, in which the form of a letter is independent of the context in which it is used (e.g., the letter "a" always appears the same regardless of the context in which it is used). As used herein the term "glyph" means any sign, symbol, and/or character having different forms based on the contextual properties of the glyph. In various contextual based languages, individual glyphs may constitute a portion of a word, or a complete word.

In various embodiments, glyph form tables are generated that include the various forms of glyphs arranged according to the particular rules of the language. For example, for languages where the form of the glyphs is affected by the location of the glyph in the word, a glyph form table may be generated including each glyph form for each glyph at each possible location within a word (e.g., front, middle, or end). Other glyph form tables may be generated based on other rules, i.e., the glyph form tables can be customized to the grammatical rules of each contextual language. For example, particular idioms or special phrases may include particular forms of glyphs. A separate glyph form table may be generated based on these special terms. Other special rules, such as rules governing line breaks, may also have dedicated glyph form tables.

The linguistic analyzer system and methods may be used to evaluate various types of content, including written original content, translated written content, other visual depictions of content, and the like. In some embodiments, the linguistic analyzer may be used to generate subtitles for visual and audible content (e.g., movies or films). As such, although the system and methods described herein may be discussed with respect to certain types of content, it should be understood that the methods and systems may be used with substantially any type of content.

In one example, the linguistic evaluation system may analyze an inputted content by comparing each glyph with the particular rules of the language and referencing the glyph form tables for the correct glyph form. If the inputted content includes an incorrect glyph form, the linguistic evaluation system corrects the glyph form based on the information stored in the glyph form tables. Glyphs may be analyzed one at a time, as well as two or more at a time to allow a review based on the surrounding glyphs, which can be preloaded into a buffer, such as a cache memory or other short-term storage device, for comparison. The linguistic evaluation system provides a more accurate contextual based language analysis than can be achieved using other methods because each of the glyph forms and rules is encoded in a reference table that can be quickly and efficiently compared to the translation text.

Embodiments of the linguistic evaluation system described herein may be useful for developing automatic linguistic evaluation systems for languages employing complex linguistic rules. The linguistic evaluation system may also be useful in emerging technology spaces where accurate translation is critical. For example, the videogame industry reaches diverse markets throughout the world, and relies on accurate and efficient translation to market individual games across languages. As such, there is a need for systems that enable the ability to quickly and accurately confirm that translated text is accurate and technically correct.

DETAILED DESCRIPTION

Figure 1:
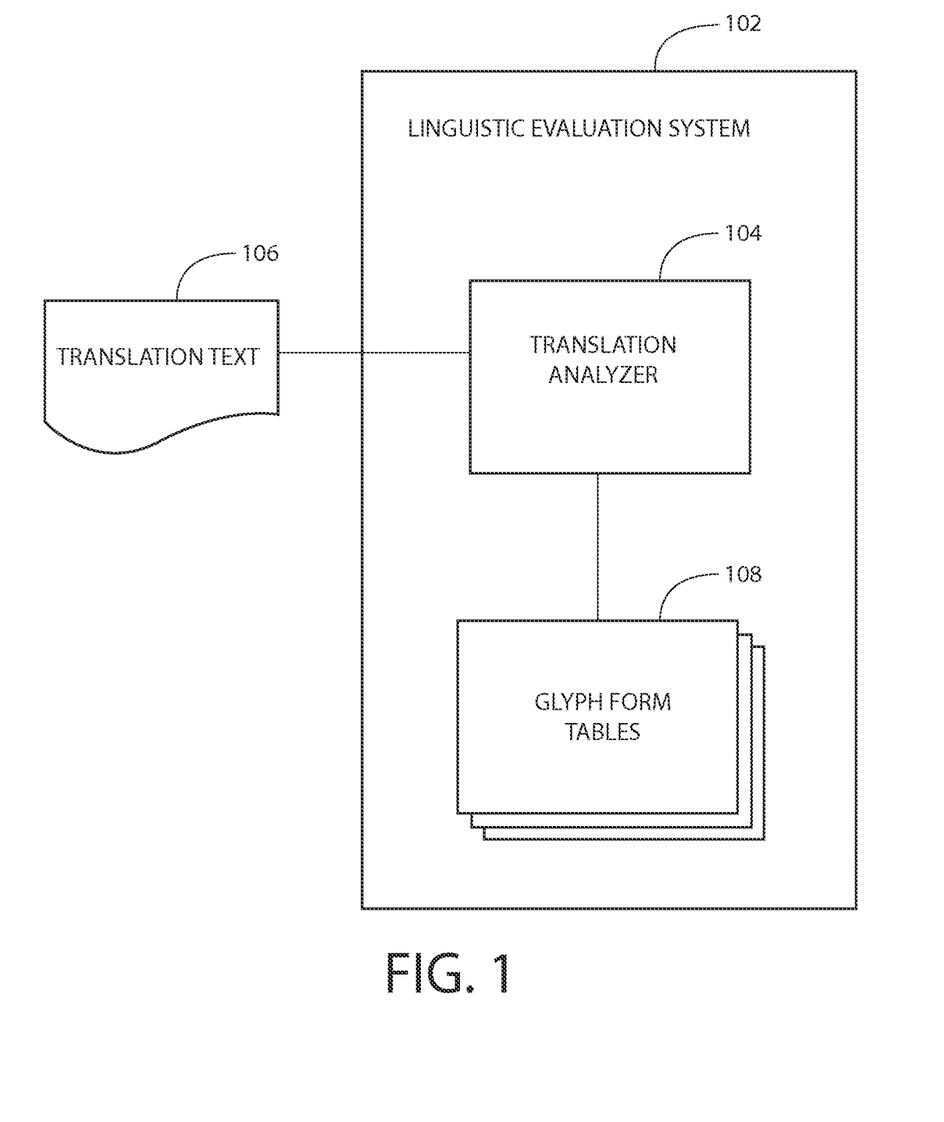
FIG. 1 is a functional block diagram of a linguistic evaluation system.

FIG. 1 is a functional block diagram of a linguistic evaluation system, generally designated 102. The linguistic evaluation system generally includes a translation analyzer 104 and one or more glyph form tables 108. In various embodiments, the linguistic evaluation system 102 can be a server, a laptop computer, a tablet computer, a netbook computer, a personal computer (PC), or a desktop computer. In another embodiment, the linguistic evaluation system 102 can represents a computing system utilizing clustered computers and components to act as a single pool of seamless resources. In yet another embodiment, the linguistic evaluation system 102 may be integrated with a content management framework. In general, the linguistic evaluation system 102 can be any programmable electronic device or a combination of devices with access to the translation text 106 and the glyph form tables 108, and capable of executing the translation analyzer 104. The linguistic evaluation system 102 may include internal and external components, as depicted and described in further detail with respect to FIG. 6.

The translation analyzer 104 is a set of computer executable program instructions for execution by the linguistic evaluation system 102. The translation analyzer 104 can analyze and correct a translated text such as translation text 104, or a portion thereof, based on a set of predetermined rules. The translation analyzer 102 may include specific rules for one or more contextual based languages such as, but not limited to, Arabic, Hebrew, Chinese, and Japanese. In certain embodiments, the translation analyzer includes grammatical rules and form rules for contextual based languages. In various embodiments, the translation analyzer 102 systematically compares glyphs in the translation text 106 to rules encoded in the translation analyzer 102, determine the applicable rule for each glyph in the translation text 104, and determine if the proper glyph form is used in the translation text 106 by reference to the glyph form tables 108. In certain embodiments, the translation analyzer 102 can correct glyphs having an improper form or otherwise not complying with the particular rules of the language.

The linguistic evaluation system 102 may receive as an input a translation text 106, which may be stored in local memory or in a remote memory system. The translation text 106 can be a text file, a document file, a file generated through optical character recognition, or any other type of document prepared in a language for which the translation analyzer 102 can be executed. In various embodiments, the translation text 106 is written in a contextual language in which the forms of glyphs in the text depend on certain contextual properties. Contextual properties may include, for example, the location of a glyph in a word, the identity of glyphs surrounding a specific glyph, line break properties, special terms in which the glyph is used, etc. In some embodiments, the translation text 106 may include a script for a videogame translated from the original language (e.g., a character based language such as English) into a contextual based language (e.g., Arabic) (the "translation language") for release in a market that primarily uses the translation language. In various embodiments, the translation text 106 may be prepared by manual (human) translation or automated (machine) translation. Both automated and machine translations are error prone due the complex rules governing contextual based languages. As a result of an imperfect translation process, the translation text 106 can include one or more grammatical or glyph form errors. For example, a glyph may require a particular form when used at the beginning of a word as opposed to the end of a word. The translation text 106 may improperly include the final form of the glyph, despite the glyph appearing at the beginning of the word. Such errors can be corrected by the translation analyzer 104 operating on the translation text 106.

The glyph form tables 108 can be one or more predefined tables including the proper forms of certain glyphs within the translation language based on the context in which the glyph is used. The glyph form tables 108 may be populated manually or automatically based on the particular rules of a particular contextual based language. In certain embodiments, the number and organization of the glyph form tables 108 can depend on the number and types of rules in the translation language. For example, one table may correspond to rules governing the form of glyphs with respect to the location of the glyph in a word. Another table may include proper glyph forms based on surrounding glyphs. Yet another table may include a proper glyph form for use when a particular meaning is intended by the glyph. In yet another embodiment, a glyph form table may include a glossary or dictionary of particular terms such as proper nouns. In various embodiments, any number of glyph form tables 108 may be used depending on the number and types of rules governing the translation language. An example glyph form table is discussed in further detail with reference to FIG. 4. The glyph form tables 108 may be stored in a memory device within the linguistic evaluation system 102 and accessed by the translation analyzer 104 during operation.

By compiling the rules and possible forms of a particular contextual language into the translation analyzer 104 and/or the glyph form tables 108, the linguistic evaluation system 102 can provide an expedient, efficient, and reliable tool for correcting the translation text 106. Such systems provide users, such as software developers, video game designers, writers, and others with the ability to quickly and accurately correct translated texts for any contextual based language for which the linguistic evaluation system 102 has been adapted. For example, a videogame developer may efficiently check the accuracy of a translation of the videogame script, which may include tens of thousands of lines, from the native language of development to a contextual based language in which the forms and meanings of various glyphs can depend on the surrounding glyphs.

Figure 2:
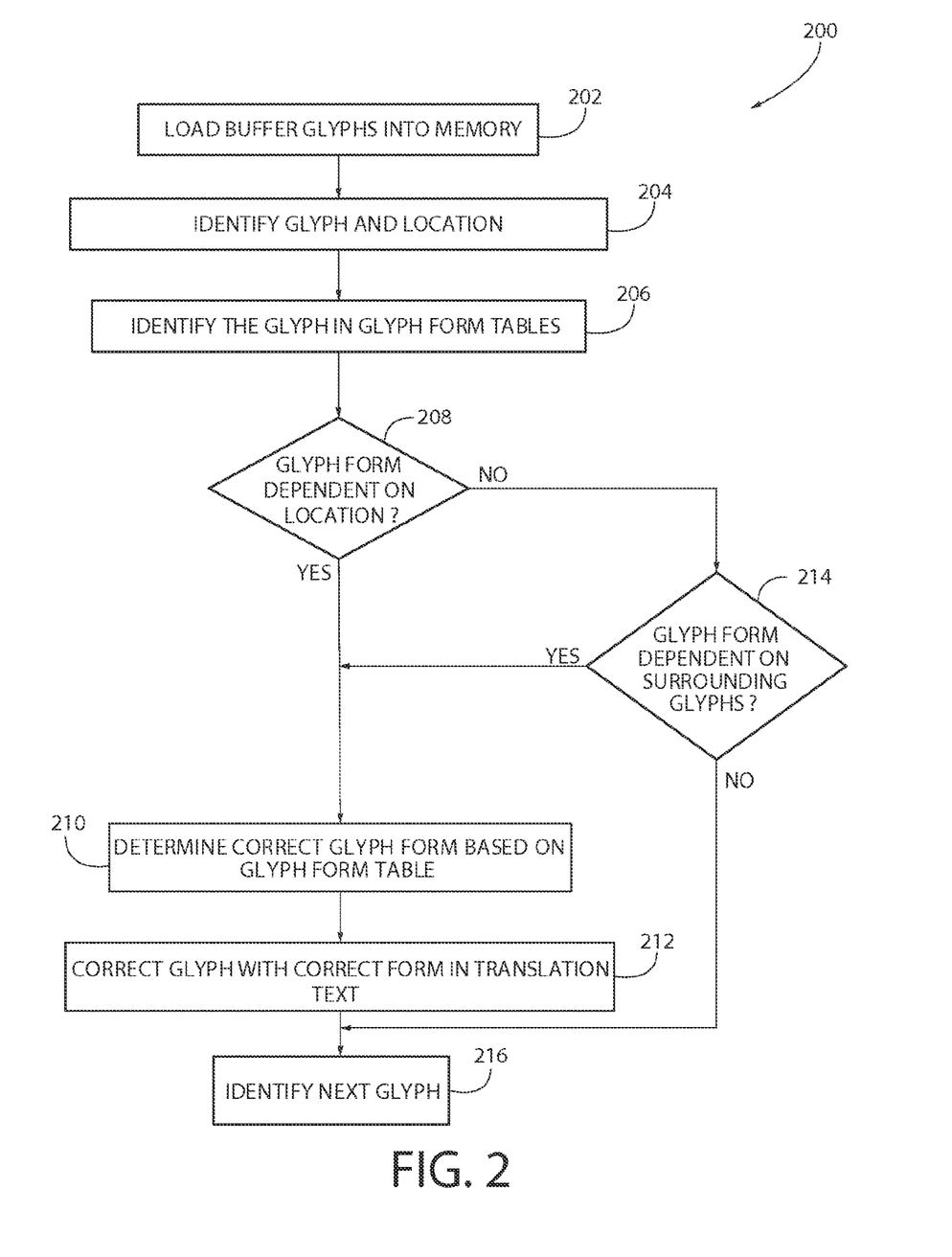
FIG. 2 is a flowchart illustrating a method of correcting location based glyph form errors.

FIG. 2 is a flowchart illustrating a method 200 for correcting location based glyph form errors in the translation text 104. In operation 202, the translation analyzer 104 loads buffer glyphs into memory. The translation analyzer 104 may locate a particular glyph (the "target glyph") in the translation text 106 for analysis. To determine which form of the glyph should be used, the translation analyzer 104 can load a predetermined number of glyphs from the translation text 106 on either side of the target glyph into a memory, such as a buffer, cache, or other temporary storage, for efficient access. The glyphs that are loaded into the buffer may be referred to as surrounding glyphs, environmental glyphs, or buffer glyphs. The number and format of the buffer glyphs can be set by a user or may depend on the contextual language itself (e.g., commonly used forms, etc.). In one embodiment, the translation analyzer 104 loads three glyphs on either side of the target glyph into the buffer. The buffer glyphs may provide the necessary context, such as the location of the target glyph in the word, to determine the proper form of the target glyph.

In operation 204, the translation analyzer 104 identifies the location of the target glyph in the translation text 106. Identifying the location of the target glyph may include, for example, determining the location of the target glyph within a single word, or within a line. In various embodiments, the relevant location of the target glyph can depend on the particular rules of the translation language. For example, some contextual based languages have rules governing glyph forms based on the location of the glyph within a word, while other languages have rules governing line breaks in relation to particular glyphs. The translation analyzer 104 may determine the location of the target glyph in the translation text 106 by referencing the buffer glyphs stored in operation 202. For example, if the buffer glyph immediately preceding the target glyph is a space, then the translation analyzer 104 may determine that the target glyph is located at the beginning of a word. Alternatively, if the buffer glyph immediately following the target glyph is a space, then the translation analyzer 104 may determine that the target glyph is located at the end of a word. In yet another embodiment, the translation analyzer 104 may determine that the buffer glyphs do not include spaces on either side of the target glyph. In this embodiment, the translation analyzer 106 may determine that the target glyph is located in the middle of a word.

In operation 206, the translation analyzer identifies the target glyph in the glyph form tables 108. For example, the processing element compares the glyph form from the translation text 106 with a glyph form table 108 containing all of the possible glyph forms in the translation language until a matching glyph is found. In another embodiment, the glyph may be identified based on an encoding method, such as Unicode, which may be included, for example, in metadata associated with the translation text 106. The translation analyzer 104 may locate the associated Unicode identifier in one of the glyph form tables 108. In such embodiments, the contents of the glyph form tables may include the Unicode identifiers for each form of the glyph, and a comparison of the Unicode identifier of the glyph in the translation text 106 can be compared to the Unicode identifiers in the glyph form tables 108.

In decision block 208, the translation analyzer 104 determines whether the form of the target glyph depends on the location of the target glyph in the word. In one embodiment, a glyph form table 108 may include all of the forms of the target glyph depending on the location of the glyph in the word. For example, in Arabic, each glyph may have at least an initial form, a medial form, and a final form. For some glyphs, the glyph forms may be the same regardless of where the glyph appears in the word. For other glyphs, the form may change depending on the location of the glyph in the word. The translation analyzer 104 determines whether the glyph form depends on the location of the glyph in the word by referencing the appropriate glyph form table 108, locating the target glyph in the appropriate glyph form table 108, and comparing the different possible forms of the target glyph to determine whether the form of the target glyph depends on its location in the word.

If the translation analyzer 104 determines that the glyph form of the target glyph depends on the location of the glyph within the word (decision block 208, YES branch), then the translation analyzer 104 determines the correct form of the target glyph based on a glyph form table 108 in operation 210. In various embodiments, the translation analyzer 104 may determine the correct glyph form by comparing the location of the target glyph to the glyph form table 108 including location information for the glyphs. For example, each column of the glyph form table 108 may correspond to a different glyph location, while the rows of the glyph form table 108 may correspond to the individual glyphs. Accordingly, by referencing the target glyph identity as determined in operation 206 and the location of the target glyph as identified in operation 204, the proper form of the target glyph may be determined by reference to the glyph form table 108 that specifies the form of each glyph depending on the location of the glyph in the word. In operation 212, the translation analyzer 104 may ensure that the target glyph in the translation text 106 matches the proper form of the glyph as determined by referencing the glyph form table 108 and correct or replace the target glyph if necessary.

Figure 4:
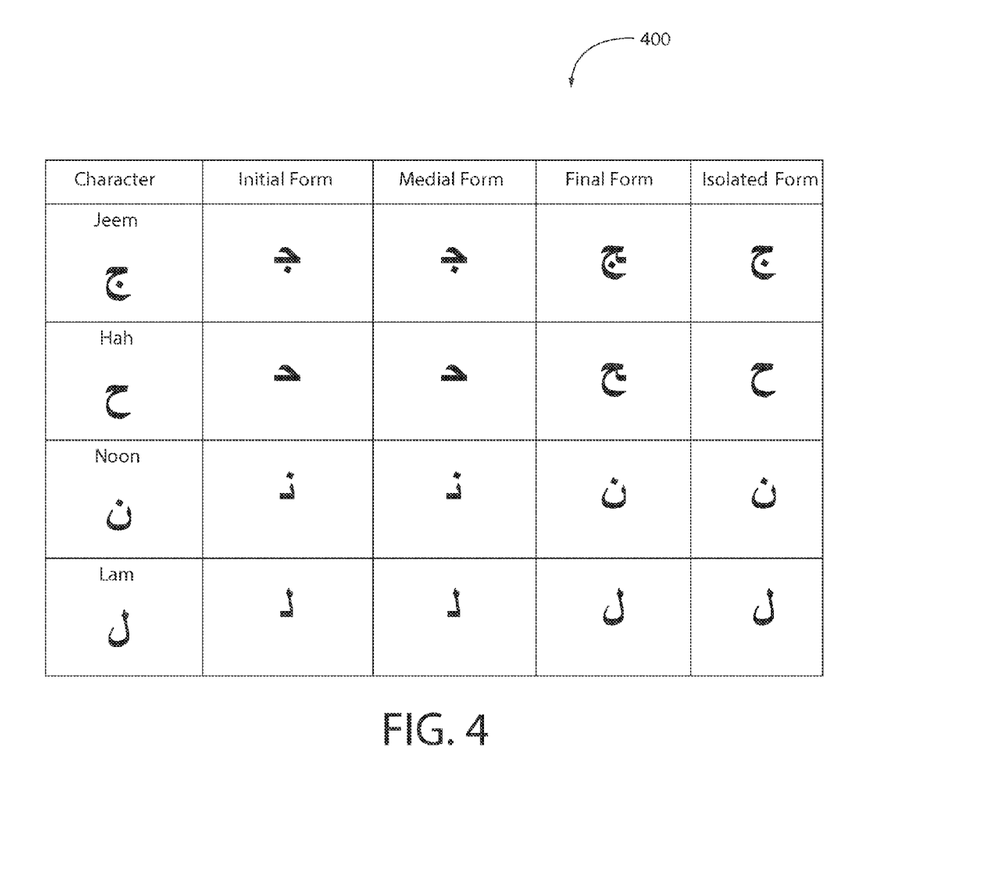
FIG. 4 is an example of a location based glyph form table.

FIG. 4 is an example of a location based glyph form table for Arabic, generally designated 400. In various embodiments, the glyph form table 400 may be implemented as one of the glyph form tables 108 such as that described above with respect to decision block 208. With reference to FIG. 4, the glyph form table 400 illustrates varying glyph forms depending on the location of the glyph in a word. In particular, in glyph form table 400, the glyph forms for four Arabic characters: Jeem, Hah, Noon, and Lam are shown. Each of the four depicted glyphs has an initial form, a medial form, a final form, and an isolated form. Those skilled in the art will appreciate that, though FIG. 4 shows the graphical representation of the glyphs in the glyph form table, the glyphs may be represented in an encoded format, such as Unicode. As described above with respect to FIG. 2, the translation analyzer 104 may identify a glyph in a word, and determine the location of the glyph in the word based on the surrounding glyphs loaded into a buffer. Based on the character identity and the location information, the translation analyzer 104 can reference the glyph form table of FIG. 4 to determine the proper form of the glyph in the translation text 106.

Returning again to FIG. 2, if the translation analyzer 104 determines that the glyph form is independent of the location of the glyph in the word (decision block 208, NO branch), then the translation analyzer 104 determines whether the glyph form depends on the identity of the surrounding glyphs in decision block 214. The translation analyzer 104 may determine whether the form of the target glyph depends on the surrounding glyphs by referencing a glyph form table

108. The translation analyzer 104 may reference a glyph form table 108 that indicates whether a particular form of the target glyph is required by the surrounding glyphs, which may be determined with reference to the buffer glyphs stored in a temporary storage device in operation 202. For example, the glyph form table 108 used for this determination may include a row for each target glyph and a column for each possible glyph that can affect the form of the target glyph. Each entry in the glyph form table 108 may indicate which form of the target glyph should be used if it follows or precedes another particular glyph. If the translation analyzer 104 determines that the glyph form does not depend on the surrounding glyphs, then the translation analyzer 104 identifies the next glyph in the translation text 106 in operation 216 or the translation analyzer 104 may terminate if all glyphs have been analyzed. If the translation analyzer 104 determines that the glyph form does depend on the surrounding glyphs (decision block 214, YES branch), then the translation analyzer 104 determines the correct glyph form based on the relevant glyph form table 108 in operation 210.

According to the operations of the method 200, the translation text 106 can be quickly and efficiently analyzed and corrected to comply with the contextual language of the translation text 106. In some embodiments, the method 200 may be performed on some or all of the translation text 106. In certain embodiments, the method 200 may only analyze portions of the translation text 106 that have changed since a previous analysis was conducted. By executing the method 200 on the translation text 106, the accuracy of the translation text 106, and its compliance with the particular rules of the contextual language in which it is written can be improved.

Figure 3:
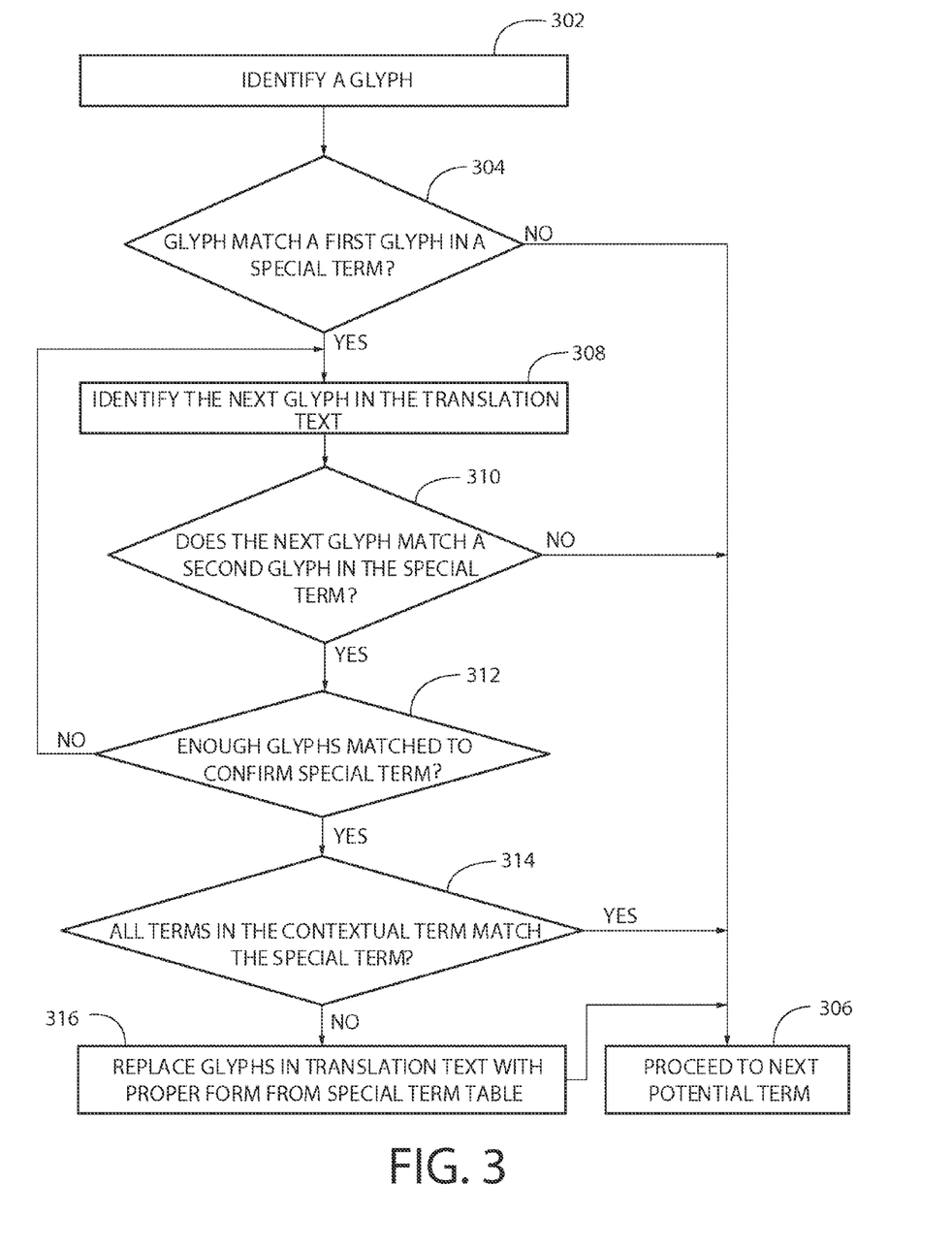
FIG. 3 is a flowchart illustrating a method of correcting contextual based glyph form errors.

FIG. 3 is a flowchart illustrating a method 300 for correcting contextual based glyph form errors in a translation text 106. In various embodiments, the language of the translation text 106 may include specific words, phrases, idioms, or other contextual devices in which certain glyphs appear in a specific form and/or order based on the context in which they are used. In operation 302, the translation analyzer 104 identifies a target glyph in the translation text 106. As described above with respect to FIG. 2, the glyph may be identified by reference to a glyph form table 108 or by an encoding mechanism, such as Unicode. In certain embodiments, the target glyph is the first glyph in a word in the translation text 106.

In decision block 304, the translation analyzer 104 determines whether the target glyph matches a first glyph in a special term. In various embodiments, at least one of the glyph form tables 108 includes a number of special terms that require particular glyph forms and/or orders. In decision block 304, the translation analyzer 104 may compare the target glyph to the first glyph in each of the special terms in the glyph form table 108. If the translation analyzer 104 determines that the target glyph does not match any of the first glyphs in the special terms in the glyph form table 108 (decision block 304, NO branch), then the translation analyzer 104 proceeds to the next potential special term in the translation text 106 in operation 306 or, if all potential special terms have been analyzed, the translation analyzer 104 may terminate. If the translation analyzer 104 determines that the identified glyph matches the first glyph in one or more special terms in the glyph form table 108 (decision block 304, YES branch), then the translation analyzer 104 identifies the next glyph in the translation text 106 in operation 308. In various embodiments, the next glyph may be identified in the same manner as the first glyph as described with respect to operation 302.

In decision block 310, the translation analyzer 104 determines, via a processor, whether the next glyph in the translation text 106 matches the second glyph in the special term in the glyph form table 108. The translation analyzer 104 compares the next glyph in the translation text 106 with the next glyph in the special term that matched the first glyph in the glyph form table 108. This comparison may occur with reference to the same glyph form table 108 that was referenced in decision block 304. If the next glyph in the translation text 106 does not match the second glyph in the special term of the glyph form table 108 (decision block 310, NO branch), then the translation analyzer 104 proceeds to the next potential special term in the translation text 106 in operation 306, or if all potential special terms have been analyzed, the translation analyzer 104 may terminate.

If the next glyph in the translation text 106 does match the second glyph in the special term of the glyph form table 108 (decision block 310, YES branch), then the translation analyzer 104 determines whether enough glyphs in the translation text 106 have matched the glyphs in the special term in the glyph form table 108 to conclude that the translation text 106 is using the special term in decision block 312. In various embodiments, the translation analyzer 104 may include a predetermined or configurable threshold value for matching terms in the translation text with special terms. The translation analyzer 104 may compare the number of matched glyphs with the threshold value in decision block 312. If the translation analyzer 104 determines that at least the threshold number of glyphs in the translation text 106 match the special term in the glyph form table 108 (decision block 312, YES branch), then the translation analyzer 104 ensures that the glyphs in the translation text 106 match the glyphs in the special term in the glyph form table 108 in operation 314. If the translation analyzer 104 determines that the number of glyphs in the translation text 106 that match the special term in the glyph form table 108 (decision block 312, NO branch), then the translation analyzer 104 identifies the next glyph in the translation text in operation 308 for comparison to the special term in the glyph form table 108.

The method 300 provides a mechanism for checking that certain terms in the translation text 106 are in the proper format where the desired meaning of the particular term affects the form of the glyphs that make up the term in the contextual language. Many languages include phrases, manners of expression, or idioms in which the literal meaning of the words does not convey the intended meaning of the phrase. Similarly, in contextual language, the form of certain glyphs may affect the meaning of the written words. By comparing the glyphs in the translation text 106 to a glyph form table 108 containing such special terms, the method 300 can improve the quality of the translation text 106.

Figure 5A:
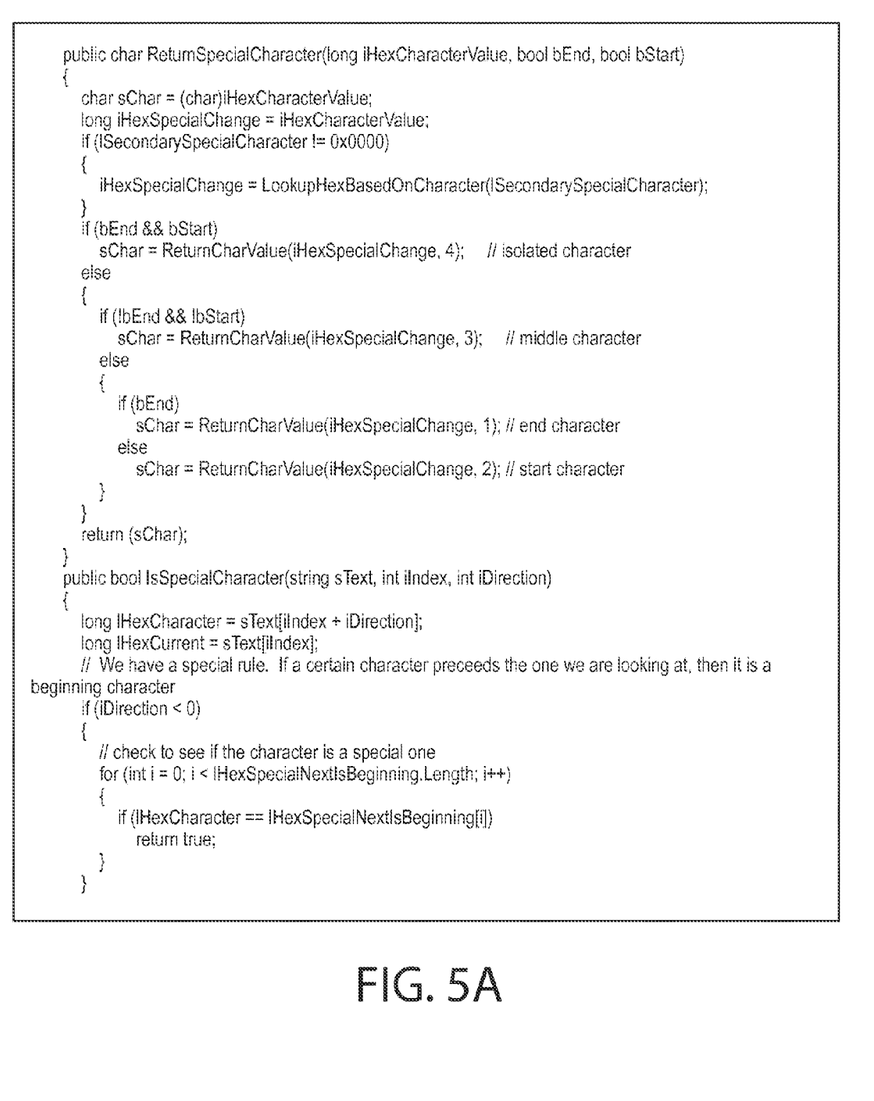
FIG. 5A is an example of computer program instructions for correcting location based glyph form errors.

FIG. 5A depicts example computer program instructions for correcting location based glyph form errors, in accordance with an example embodiment. The computer program instructions depicted in FIG. 5A may be included, in whole or in part, in the translation analyzer 104. In the embodiment of FIG. 5A, the translation analyzer 104 can first determine whether a target glyph is an isolated character, a middle character, an end character, or a start character by analyzing the glyphs surrounding the target glyph that have been loaded into buffers. Based on the location of the identified glyph, the proper glyph form may be determined with reference to a glyph form table 108, as described above with respect to FIGS. 2 and 4. The embodiment of FIG. 5A also includes a special rule for determining whether an identified glyph is a start character (and therefore have an initial form as described above with respect to FIG. 4) based on the preceding glyph. The translation analyzer 104 may determine that, following any one of certain glyphs, the next glyph should have an initial form. The translation analyzer 104 may reference the glyph immediately preceding the target glyph to determine if the preceding glyph requires an initial form of the following glyph. If so, then the target glyph may be changed to its initial form with reference to a glyph form table 108, as described above. By organizing a glyph form table 108 as described with respect to FIG. 4, the translation analyzer 104 may efficiently and accurately determine the proper form of a glyph in the translation text 106 once the glyph has been identified and its location in the word determined as described above with respect to FIG. 2.

Figure 5B:
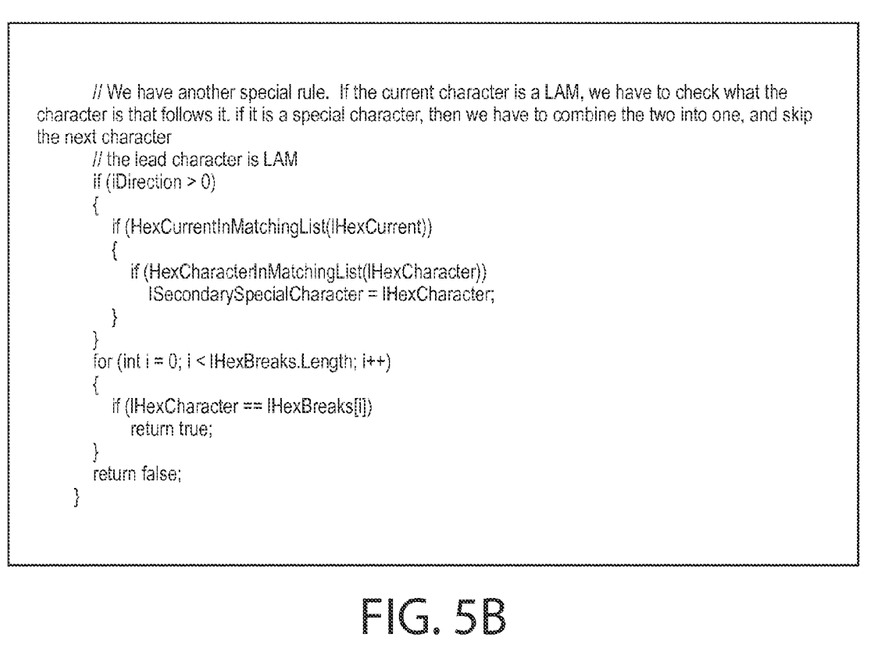
FIG. 5B is an example of computer program instructions for correcting glyph form errors.

FIG. 5B depicts example computer program instructions for correcting glyph form errors, in accordance with an example embodiment. In particular, FIG. 5B shows example computer instructions for correcting the translation text 106 based on the identification of the Arabic glyph "LAM" (shown in FIG. 4). The computer program instructions depicted in FIG. 5B may be included, in whole or in part, in the translation analyzer 104. According to the embodiment of FIG. 5B, if the identified glyph is LAM, and the next glyph (which has been loaded into a buffer) is a special character (which may be determined with reference to a glyph form table 108), then the glyph LAM and the following glyph should be combined into a single glyph and the following glyph should be removed. The combined forms of LAM and special characters may be stored, for example, in a glyph form table 108. Those skilled in the art will appreciate that the example computer program instructions described with respect to FIGS. 5A and 5B can be modified to conform to the particular rules applicable in any glyph based language. For example, some languages, such as Japanese and Chinese may have a greater number of rules affecting the glyph form based on the intended meaning or context, and fewer rules that relate to the position of the glyph in a word or phrase.

Figure 6:
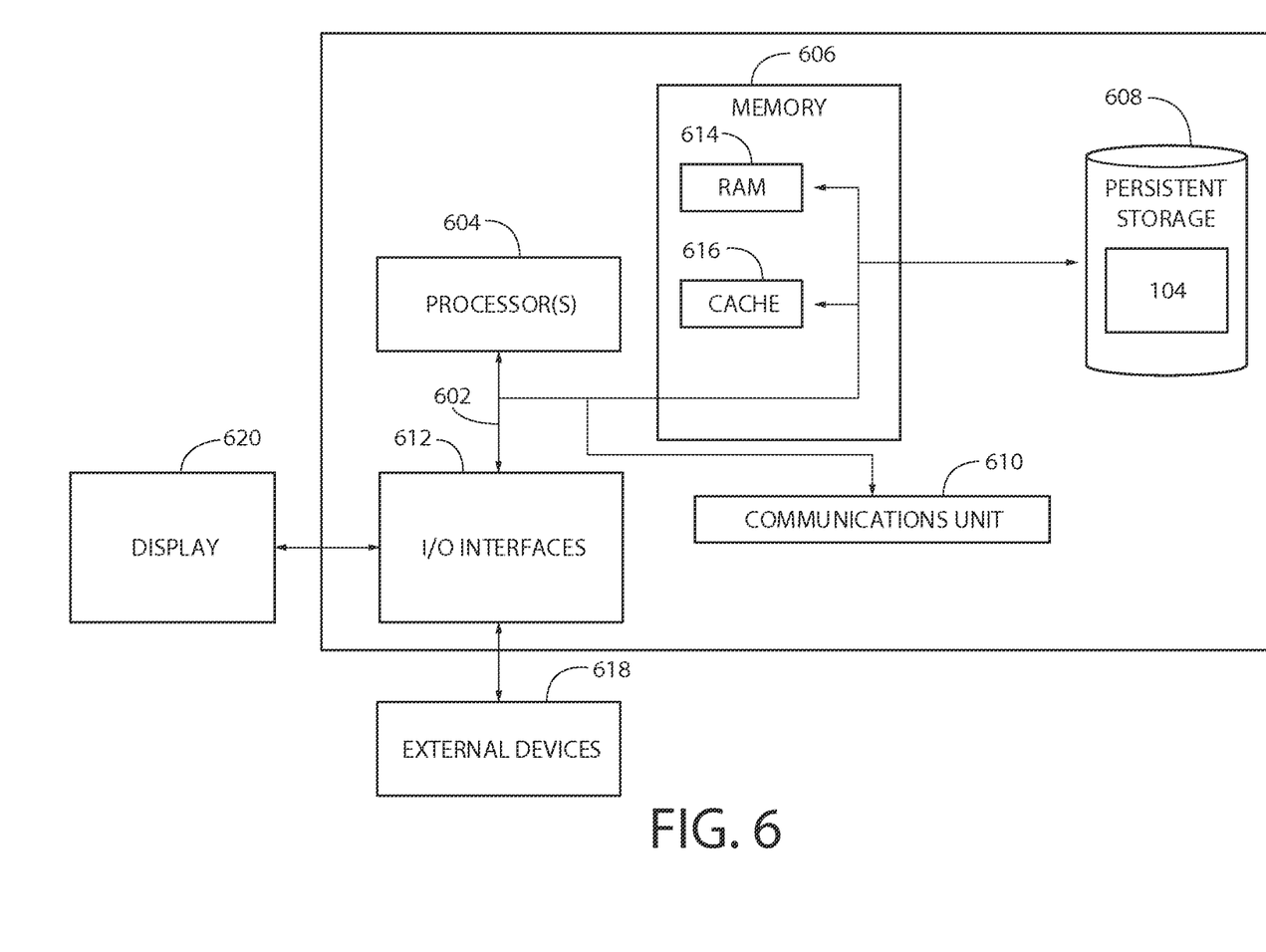
FIG. 6 is a functional block diagram of exemplary components of the linguistic evaluation system of FIG. 1.

FIG. 6 depicts a block diagram of exemplary components of the linguistic evaluation system 102, in accordance with an example embodiment of the present invention. It should be appreciated that FIG. 6 provides only an illustration of one implementation and does not imply any limitations with regard to the environments in which different embodiments may be implemented. Many modifications to the depicted environment may be made.

The linguistic evaluation system 102 includes a communications fabric 602, which provides communications between a computer processor(s) 604, a memory 606, a persistent storage 608, a communications unit 610, and an input/output (I/O) interface(s) 612. The communications fabric 602 can be implemented with any architecture designed for passing data and/or control information between processors (such as microprocessors, communications and network processors, etc.), system memory, peripheral devices, and any other hardware components within a system. For example, the communications fabric 602 can be implemented with one or more buses.

The memory 606 and the persistent storage 608 are computer-readable storage media. In this embodiment, the memory 606 includes random access memory (RAM) 614 and a cache memory 616. In general, the memory 606 can include any suitable volatile or non-volatile computer-readable storage media.

The translation analyzer is stored in the persistent storage 608 for execution by one or more of the respective computer processors 604 via one or more memories of the memory 606. In this embodiment, the persistent storage 608 includes a magnetic hard disk drive. Alternatively, or in addition to a magnetic hard disk drive, the persistent storage 608 can include a solid state hard drive, a semiconductor storage device, read-only memory (ROM), erasable programmable read-only memory (EPROM), flash memory, or any other computer-readable storage media that is capable of storing program instructions or digital information.

The media used by the persistent storage 608 may also be removable. For example, a removable hard drive may be used for the persistent storage 608. Other examples include optical and magnetic disks, thumb drives, and smart cards that are inserted into a drive for transfer onto another computer-readable storage medium that is also part of the persistent storage 608.

The communications unit 610, in these examples, provides for communications with other data processing systems or devices. The communications unit 610 can include one or more network interface cards and/or one or more near field communication devices. The communications unit 610 may provide communications through the use of either or both physical and wireless communications links. Computer programs and processes may be downloaded to the persistent storage 608 through the communications unit 610.

The I/O interface(s) 612 allows for input and output of data with other devices that may be connected to the linguistic evaluation system 102. For example, the I/O interface 612 may provide a connection to external devices 618, which may include a keyboard, a keypad, a mouse, a touch screen, a camera, and/or some other suitable input device. The external devices 618 can also include portable computer-readable storage media such as, for example, thumb drives, portable optical or magnetic disks, and memory cards. Software and data used to practice various embodiments, such as the translation analyzer 104, the translation text 104, and the glyph form tables 108, can be stored on such portable computer-readable storage media and can be loaded onto the persistent storage 608 via the I/O interface(s) 612. The I/O interface(s) 612 may also connect to a display 620.

The display 620 provides a mechanism to display data to a user and may be, for example, an embedded display screen or touch screen.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A method for correcting/translating contextual language content comprising:
   identifying, by a processor, a first form of a first glyph having a plurality of contextual properties in the contextual language content;
   storing, by the processor, a plurality of buffer glyphs in a storage device, wherein the plurality of buffer glyphs surround the first glyph in the translated text;
   determining, by the processor, the plurality of contextual properties of the first glyph based on the plurality of buffer glyphs; and
   analyzing, by the processor, the first form of the first glyph with reference to one or more glyph form tables comprising a plurality of forms of the first glyph based, at least in part, on the plurality of contextual properties, wherein analyzing the first form of the first glyph comprises:
      determining, by the processor, a second form of the first glyph based, at least in part, on the one or more tables and the contextual properties; and
      indicating, by the processor, a corrected form of the first glyph.

2. The method of claim 1, wherein the contextual properties comprise at least one of a location of the first glyph in a word, an identity of one or more surrounding glyphs, and a meaning of the first glyph in the translated text.

3. The method of claim 1, wherein the translated text is a script for a videogame.

4. The method of claim 1, further comprising:
   determining, by the processor, whether the first glyph in the word in the translated text matches a first special term glyph of a special term in a first table;
   responsive to determining that the first glyph matches the first special term glyph, identifying, by the processor, one or more additional glyphs in the translated text, wherein the additional glyphs sequentially follow the first glyph;
   determining, by the processor, whether the one or more additional glyphs match one or more additional special term glyphs in the first table; and
   responsive to determining that the one or more additional glyphs match the one or more additional special term glyphs, replacing, by the processor, the word in the translated text with the special term.

5. The method of claim 4, further comprising:
   comparing, by the processor, a number of the one or more additional glyphs to a threshold amount of glyphs, wherein replacing the word in the translated text with the special term is responsive to determining that the number of the one or more additional glyphs exceeds the threshold amount.

6. The method of claim 1, wherein the one or more tables comprises a location based table having at least an initial form, a medial form, and a final form for the first glyph.

7. A computer program product for correcting a symbol in a translated text comprising:
   a non-transitory, machine readable storage device having computer program instructions stored thereon for execution by a processor, the program instructions comprising:
      program instructions to identify a symbol having a plurality of contextual properties in a translation text;
      program instructions to store a plurality of buffer symbols in a storage device, wherein the plurality of buffer symbols surround the symbol in the translated text;
      program instructions to determine the contextual properties of the symbol based on the plurality of buffer symbols;
      program instructions to compare a first appearance of the symbol to one or more tables describing a plurality of appearances of the symbol based, at least in part, on the plurality of contextual properties;
      program instructions to determine a second appearance of the symbol based, at least in part, on the one or more tables and the contextual properties; and
      program instructions to replace the first appearance of the symbol with the second appearance of the symbol in the translated text.

8. The computer program product of claim 7, wherein the contextual properties comprise at least one of a location of the symbol in a word, an identity of one or more surrounding symbols, and a meaning of the symbol in the translated text.

9. The computer program product of claim 7, wherein the translated text is a script for a videogame.

10. The computer program product of claim 7, wherein the computer program instructions further comprise:
    program instructions to determine whether the symbol in the word in the translated text matches a first special term symbol of a special term;
    program instructions to identify one or more additional symbols in the translated text, responsive to determining that the symbol matches the first special term symbol, wherein the additional symbols sequentially follow the first symbol;
    program instructions to determine whether the one or more additional symbols match one or more additional special term symbols in the special term; and
    program instructions to replace the word in the translated text with the special term, responsive to determining that the one or more additional symbols match the one or more additional special term symbols.

11. The computer program product of claim 10, wherein the program instructions further comprise:
    program instructions to compare a number of the one or more additional symbols to a threshold amount of symbols, wherein replacing the word in the translated text with the special term is responsive to determining that the number of the one or more additional symbols exceeds the threshold amount.

12. The computer program product of claim 7, wherein the one or more tables comprises a location based table having at least an initial form, a medial form, and a final form for the symbol.

13. A system for correcting a character in a translated text comprising:
    one or more processors; and
    a non-transitory, machine readable storage device having computer program instructions stored thereon for execution by a processor, the program instructions comprising:
       program instructions to identify a first style of a character having a plurality of contextual properties in a translation text;
       program instructions to store a plurality of environmental characters in a storage device, wherein the plurality of environmental characters surround the character in the translated text;

program instructions to determine the contextual properties of the character based on the plurality of environmental characters;

program instructions to compare the character to one or more data structures stored in the storage device and describing a plurality of styles of the character based, at least in part, on the plurality of contextual properties;

program instructions to determine a second style of the character based, at least in part, on the one or more data structures and the contextual properties; and program instructions to replace the first style of the character with the second style of the character in the translated text.

14. The system of claim 13, wherein the contextual properties comprise at least one of a location of the character in the translated text, an identity of one or more surrounding characters, and a meaning of the character in the translated text.

15. The system of claim 13, wherein the translated text is a script for a videogame.

16. The system of claim 13, wherein the computer program instructions further comprise:

program instructions to determine whether the character in a word matches a first special term character of a special term in the at least one data structure;

program instructions to identify one or more additional characters in the translated text, responsive to determining that the character matches the first special term character;

program instructions to determine whether the one or more additional characters match one or more additional special term characters in the at least one data structure; and program instructions to replace the word with the special term, responsive to determining that the one or more additional characters match the one or more additional special term characters.

17. The system of claim 16, wherein the program instructions further comprise:

program instructions to compare a number of the one or more additional characters to a threshold amount of characters, wherein replacing the word with the special term is responsive to determining that the number of the one or more additional characters exceeds the threshold amount.

* * * * *